United States Patent
Matsui (10) Patent No.: US 6,535,530 B1
(45) Date of Patent: Mar. 18, 2003

(54) APPARATUS AND METHOD FOR DEMULTIPLEXING MULTIPLEXED DATA

(75) Inventor: Yoshinori Matsui, Katanoshi (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/120,179

(22) Filed: Jul. 22, 1998

(30) Foreign Application Priority Data

Jul. 23, 1997 (JP) .............................. 9-196713

(51) Int. Cl.$^7$ .................................. H04J 3/04

(52) U.S. Cl. ......................... 370/536; 370/542

(58) Field of Search .................. 370/536, 535, 370/498, 546, 521, 529, 216, 219, 259, 352, 335, 354, 328, 316, 356, 395, 397, 401, 474, 542, 543; 709/204, 200, 232, 217, 236, 243; 348/156, 14.12, 14.01, 14.02, 592, 553, 725; 725/114, 146, 119, 139; 455/453; 359/140; 399/8; 345/333; 382/236

(56) References Cited

U.S. PATENT DOCUMENTS

| | | | |
|---|---|---|---|
| 5,742,361 A | * 4/1998 | Nakase et al. | 348/485 |
| 5,898,695 A | * 4/1999 | Fujii et al. | 370/464 |
| 5,940,129 A | * 8/1999 | Burns | 348/395 |
| 5,991,447 A | * 11/1999 | Eifrig et al. | 382/236 |
| 5,995,518 A | * 11/1999 | Burns et al. | 370/503 |
| 6,044,397 A | * 3/2000 | Eleftheriadis et al. | 709/217 |
| 6,092,107 A | * 7/2000 | Eleftheriadis et al. | 709/217 |
| RE37,327 E | * 8/2001 | Yonemitsu et al. | 386/96 |

FOREIGN PATENT DOCUMENTS

| | | |
|---|---|---|
| EP | 0 866 612 A1 | 9/1998 |
| WO | WO 98/36559 | 8/1998 |

OTHER PUBLICATIONS

ISO/IEC JTC1/SC29/WG11 N1692 MPEG4—Systems Working Draft 4.0.
ISO/IEC JTC1/SC29/WG11 N1693 MPEG4—Systems Verification Model 4.0.
"The MPEG–4 Systems and Description Languages: A Way Ahead in Audio Visual Information Representation"; O. Avaro et al.; Signal Processing, Image Communication, vol. 9, No. 4; May 1, 1997; pp. 385–431, XP004075337 *p. 424, paragraph 3—p. 428, last paragraph*.
ITU–T H.222.0 "Information Technology–Generic Coding of Moving Pictures and Associated Audio Information: Systems"; Jul., 1995; pp 8–17 and 44–46.

* cited by examiner

Primary Examiner—Douglas Olms
Assistant Examiner—Phirin Sam
(74) Attorney, Agent, or Firm—Parkhurst & Wendel, L.L.P.

(57) ABSTRACT

Disclosed is an apparatus for demultiplexing multiplexed data. This apparatus comprises a demultiplexer for receiving a multiplexed packet stream in which a plurality of object data are multiplexed, and demultiplexing the multiplexed data with reference to packet identification numbers added to the respective packets; a decoder for decoding M pieces of object data separated from the multiplexed data, and outputting M pieces of decoded object data; a memory for storing N pieces of information relating to a program and separated by the demultiplexer; a memory for storing object composition information separated by the demultiplexer; a memory for storing information relating to the object data and separated by the demultiplexer; a compositor for compositing the M pieces of decoded object data; and an information analyzer for analyzing the packet identification numbers from the N pieces of information relating to the program, the object composition information, or the information relating to the object data. Therefore, when a multiplexed packet stream in which MPEG4 data are multiplexed by MPEG2 is demultiplexed, and MPEG4 data can be separated and decoded with high reliability.

14 Claims, 5 Drawing Sheets

Fig.3 (a) program association table (PAT)

| program number | PMT_PID |
|---|---|
| 1 | 100 |
| 2 | 200 |
| 3 | 300 |
| ... | ... |

Fig.3 (b) program map table (PMT)

| stream type | ES_PID |
|---|---|
| MPEG-2 Video | 101 |
| MPEG-1 Audio | 102 |
| MPEG-4 | 110 |
| ... | ... |

Fig.3 (c) initial object descriptor section (Initial OD section)

| stream type | ES_PID |
|---|---|
| SD Stream | 103 |
| OD Stream | 104 |
| ... | ... |

Fig.3 (d) object descriptor section (OD section)

| stream type | ES_PID |
|---|---|
| MPEG-4 Video | 105 |
| MPEG-4 Video | 106 |
| ... | ... |

APPARATUS AND METHOD FOR DEMULTIPLEXING MULTIPLEXED DATA

FIELD OF THE INVENTION

The present invention relates to an apparatus and a method for demultiplexing a packet stream in which various kinds of data are multiplexed, and a data storage medium containing a program for implementing the demultiplexing process by software. More specifically, the invention relates to demultiplexing of a packet stream in which various kinds of data are multiplexed by MPEG2 which is an international standard of image compressive coding, or a packet stream in which a plurality of object data are multiplexed by MPEG4 which is currently being standardized.

BACKGROUND OF THE INVENTION

In recent years, MPEG4 has been discussed as a method for transmitting digital data of video, audio, and control information in packets (reference literatures: ISO/IEC JTC1/SC29/WG11 N1692 MPEG4-Systems Working Draft 4.0, ISO/IEC JTC1/SC29/WG11 N1693 MPEG4-Systems Verification Model 4.0). In MPEG4, digital data of compressively coded video and audio, object composition information describing hierarchy of objects, and object descriptors describing coding schemes of the objects are subjected to the MPEG4 packetization using the Access Unit Layer, and these MPEG4 packets are further packetized by another multiplexing protocol such as MPEG2 (reference literature: ISO/IEC JTC1/SC29/WG11 N801 "ISO/IEC 13818-1). On the other hand, in MPEG2, video and audio data compressively coded by MPEG2 are packetized in a format called "PES (Packetized Elementary Stream) Packet", and the PES packet is divided into fixed-length packets called "TS (Transport Stream) packets".

In MPEG4, standardization for which is currently in progress, since the MPEG4 packetization using the Access Unit Layer is indispensible, video and audio data compressively coded by MPEG2 are also subjected to the MPEG4 packetization. Therefore, when an MPEG2 data receiver for receiving satellite broadcasting or CATV broadcasting, which have been spread in recent years, receives an MPEG4 data stream in which video and audio data compressively coded by MPEG2 are MPEG4-packetized and multiplexed, the receiver cannot separate and decode the video and audio data compressed by MPEG2.

Furthermore, a broadcasting receiving terminal receives object composition information describing hierarchy of objects, and object descriptors describing coding schemes of the objects, several times, even though the contents of these data are not changed. This repetition is necessary because there is a possibility that receiving is started at an arbitrary timing in the broadcasting receiving terminal. The object composition information and the object descriptors are also subjected to MPEG4 packetization using the Access Unit Layer as well as video and audio data. However, when the receiving terminal receives such data of the same contents repeatedly, the burden on the receiving terminal may be increased.

Furthermore, MPEG4 does not provide a method for specifying object composition information, object descriptors, and video and audio data compressively coded by MPEG4, from multiplexed data.

SUMMARY OF THE INVENTION

It is an object of the present invention to provide an apparatus and a method for demultiplexing multiplexed data, that enable reliable separation and decoding of MPEG4 data even through the MPEG4 data is multiplexed by MPEG2.

Other objects and advantages of the invention will become apparent from the detailed description that follows. The detailed description and specific embodiments described are provided only for illustration since various additions and modifications within the spirit and scope of the invention will be apparent to those skilled in the art from the detailed description.

According to a first aspect of the present invention, there is provided a demultiplexing apparatus comprising: demultiplexing means for receiving a multiplexed packet stream in which a plurality of object data are multiplexed, and demultiplexing the multiplexed data with reference to packet identification numbers added to the respective packets; decoding means for decoding M pieces of object data separated from the multiplexed data, and outputting M pieces of decoded object data; a memory for storing N pieces of information relating to a program and separated by the demultiplexing means; a memory for storing object composition information separated by the demultiplexing means; a memory for storing information relating to the object data and separated by the demultiplexing means; composition means for compositing the M pieces of decoded object data; and information analysis means for analyzing the packet identification numbers from the N pieces of information relating to the program, the object composition information, or the information relating to the object data.

According to a second aspect of the present invention, in the above-described demultiplexing apparatus, the information analysis means analyzes the N pieces of information relating to the program, obtains a packet identification number PID_syn of a packet containing the object composition information, and outputs the packet identification number PID_syn to the demultiplexing means; and the demultiplexing means separates the packet containing the object composition information from the input multiplexed packet stream with reference to the packet identification number PID_syn, and outputs this packet.

According to a third aspect of the present invention, in the above-described demultiplexing apparatus, the information analysis means analyzes the N pieces of information relating to the program, obtains a packet identification number PID_od of a packet containing the information relating to the object data, and outputs the packet identification number PID_od to the demultiplexing means; and the demultiplexing means separates the packet containing the information relating to the object data from the input multiplexed packet stream with reference to the packet identification number PID_od, and outputs this packet.

According to a fourth aspect of the present invention, in the above-described demultiplexing apparatus, the information analysis means analyzes the object composition information, and outputs information indicating the hierarchical relationship of the object data toward the composition means; and the composition means composites the M pieces of decoded object data with reference to the hierarchical relationship.

According to a fifth aspect of the present invention, in the above-described demultiplexing apparatus, the information analysis means analyzes the information relating to the object data, judges a code Al_predefined for each of the object data, which code indicates whether packetization according to the international standard MPEG4 exists or not, and outputs the code Al_predefined toward the demultiplexing means; and the demultiplexing means performs separation of the MPEG4 packetization for each object data with reference to the code Al_predefined.

According to a sixth aspect of the present invention, in the above-described demultiplexing apparatus, the information analysis means analyzes the information relating to the object data, judges a code Al_predefined for each of the object data, which code indicates whether packetization according to the international standard MPEG4 exists or not, and outputs the code Al_predefined toward the decoding means; and the decoding means performs separation of the MPEG4 packetization with reference to the code Al_predefined.

According to a seventh aspect of the present invention, in the above-described demultiplexing apparatus, the information analysis means analyzes the information relating to the object data, judges a code Al_config for each of the object data, which code indicates setting information of a packet header according to the international standard MPEG4, and outputs the code Al_config toward the demultiplexing means; and the demultiplexing means performs separation of the MPEG4 packetization for each object data with reference to the code Al_config.

According to an eighth aspect of the present invention, in the above-described demultiplexing apparatus, the information analysis means analyzes the information relating to the object data, judges a code Al_config for each of the object data, which code indicates setting information of a packet header according to the international standard MPEG4, and outputs the code Al_config toward the decoding means; and the decoding means performs separation of the MPEG4 packetization with reference to the code Al_config.

According to a ninth aspect of the present invention, in the above-described demultiplexing apparatus, the information analysis means analyzes the N pieces of information relating to the program, obtains a packet identification number PID_d of a packet containing the object data and a packet identification number FMC_d according to the international standard MPEG4, and outputs these identification numbers toward the demultiplexing means; and the demultiplexing means separates the packet containing the object data from the input multiplexed packet stream with reference to the identification numbers PID_d and FMC_d, and outputs the packet.

According to a tenth aspect of the present invention, in the above-described demultiplexing apparatus, the information analysis means obtains a code for deciding whether the packet identification number FMC_d according to the international standard MPEG4 is added or not, by analyzing the N pieces of information relating to the program.

According to an eleventh aspect of the present invention, in the above-described demultiplexing apparatus, the information analysis means receives the object composition information which is divided into at least one section, and integrates these sections with reference to version numbers and section numbers which are added at the heads of the respective sections, thereby obtaining the object composition information.

According to a twelfth aspect of the present invention, in the above-described demultiplexing apparatus, the information analysis means receives the information relating to the object data, which information is divided into at least one section, and integrates these sections with reference to version numbers and section numbers which are added at the heads of the respective sections, thereby obtaining the information relating to the object data.

According to a thirteenth aspect of the present invention, in the above-described demultiplexing apparatus, the information analysis means receives the object composition information which is divided into at least one section, decides whether data of each section has a data error or not according to an error detection code added to the end of each section, and discards the section having a data error.

According to a fourteenth aspect of the present invention, in the above-described demultiplexing apparatus, the information analysis means receives the information relating to the object data, which is divided into at least one section, decides whether data of each section has a data error or not according to an error detection code added to the end of each section, and discards the section having a data error.

According to a fifteenth aspect of the present invention, there is provided a demultiplexing method comprising the steps of: receiving a multiplexed packet stream in which a plurality of object data are multiplexed, and separating packets containing N pieces of information relating to a program from the multiplexed packet stream with reference to packet identification numbers added to the respective packets; analyzing the N pieces of information relating to the program, and obtaining a packet identification number PID_syn of a packet containing object composition information, and a packet identification number PID_od of a packet containing information relating to the object data; and separating packets, the packet identification numbers of which match the packet identification numbers PID_syn and PID od, from the multiplexed packet stream.

According to a sixteenth aspect of the present invention, there is provided a data recording medium in which a program is recorded, and the program comprises the steps of: receiving a multiplexed packet stream in which a plurality of object data are multiplexed, and separating packets containing N pieces of information relating to a program from the multiplexed packet stream with reference to packet identification numbers added to the respective packets; analyzing the N pieces of information relating to the program, and obtaining a packet identification number PID_syn of a packet containing object composition information, and a packet identification number PID_od of a packet containing information relating to the object data; and separating packets, the packet identification numbers of which match the packet identification numbers PID_syn and PID_od, from the multiplexed packet stream.

BRIEF DESCRIPTION OF THE DRAWINGS

FIGS. 3(*a*)–3(*d*) illustrate data tables of packets in the multiplexed packet stream shown in FIG. 2 and, more specifically, 3(*a*) shows a program association table, 3(*b*) shows a program map table, 3(*c*) shows an initial object descriptor section, and 3(*d*) shows an object descriptor section.

FIGS. 5(*a*)–5(*c*) are diagrams for explaining a data recording medium containing a program for implementing a demultiplexing process according to the first or second embodiment, using a computer system.

DETAILED DESCRIPTION OF THE PREFERRED EMBODIMENTS

[Embodiment 1]

Figure 1:
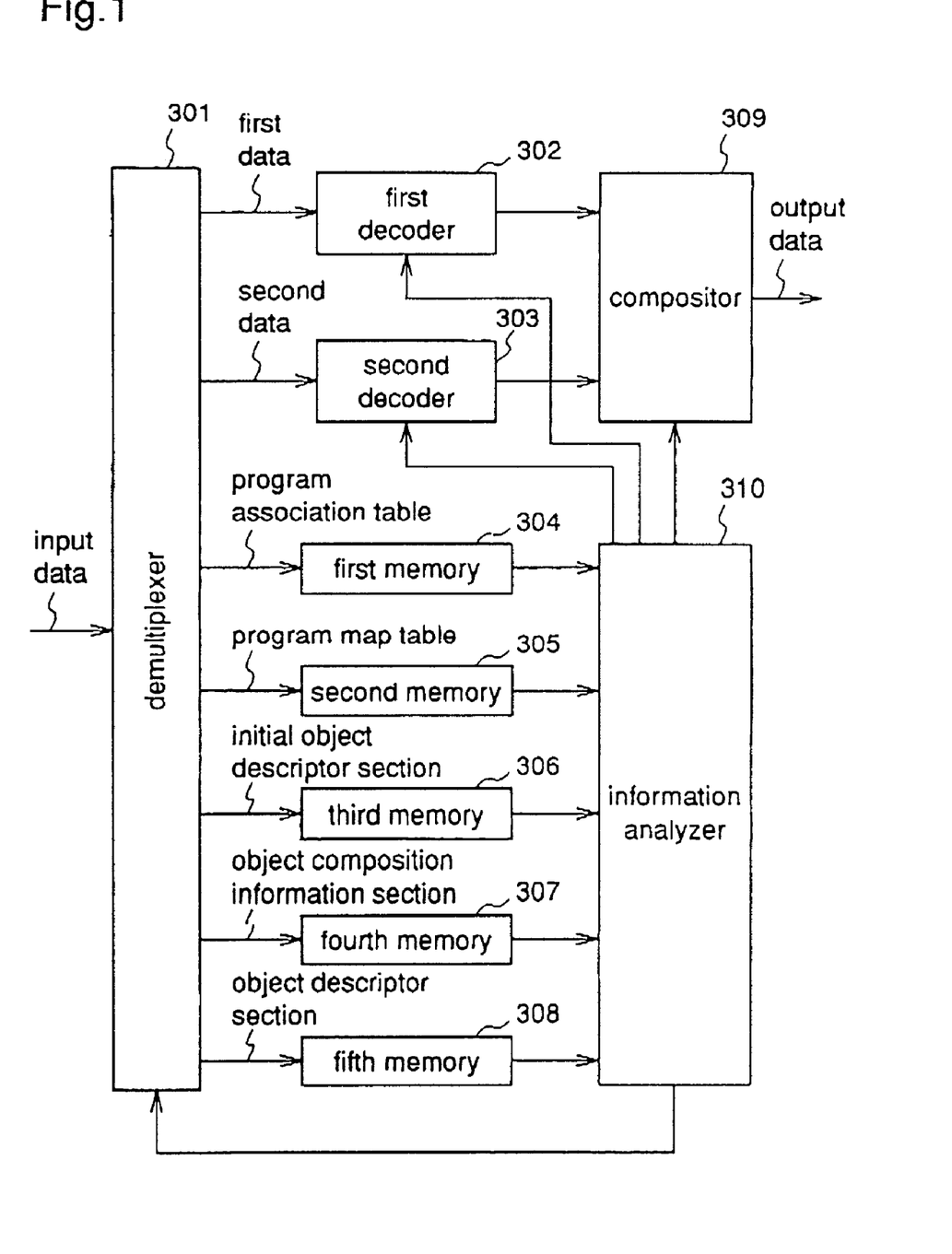
FIG. 1 is a block diagram illustrating a demultiplexing apparatus according to a first embodiment of the invention.

FIG. 1 is a block diagram for explaining an apparatus for demultiplexing multiplexed data (hereinafter referred to simply as "a demultiplexing apparatus") according to a first embodiment of the present invention.

As shown in FIG. 1, the demultiplexing apparatus according to the first embodiment comprises a demultiplexer 301 which receives a multiplexed packet stream in which a plurality of object data are multiplexed, and demultiplexes the multiplexed data with reference to packet identification numbers given to the packets; a first decoder 302 which decodes first object data separated from the multiplexed data and outputs first decoded object data; a second decoder 303 which decodes second object data separated from the multiplexed data and outputs second decoded object data; a first memory 304 which stores a program association table (first information relating to a program) separated by the demultiplexer 301; a second memory 305 which stores a program map table (second information relating to the program) separated by the demultiplexer 301; a third memory 306 which stores an initial object descriptor section (third information relating to the program) separated by the demultiplexer 301; a fourth memory 307 which stores an object composition information section separated by the demultiplexer 301; a fifth memory 308 which stores an object descriptor section (information relating to the object data) separated by the demultiplexer 301; a compositor 309 which composites the first decoded object data and the second decoded object data; and an information analyzer 310 which analyzes the packet identification numbers from the respective data stored in the first to fifth memories 304, 305, 306, 307, and 308.

Figure 2:
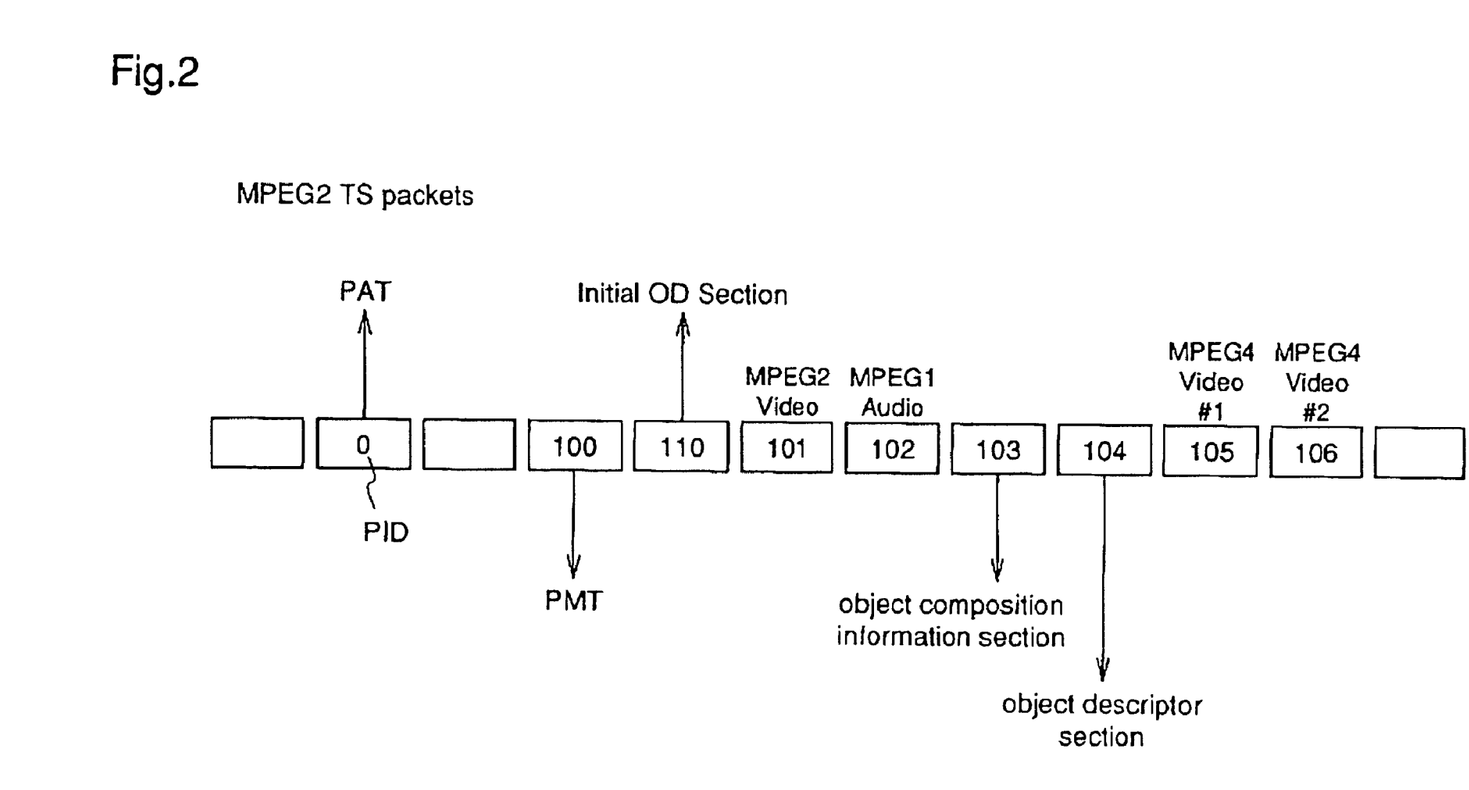
FIG. 2 is a diagram illustrating a data format of a multiplexed packet stream input to a demultiplexer according to the first embodiment.

FIG. 2 is a diagram showing a data format of the multiplexed packet stream input to the demultiplexer 301. Referring to FIG. 2, the multiplexed packet stream is divided into a plurality of fixed-length packets which are defined as TS (Transport Stream) packets in MPEG2, and each packet is given a packet identification number called PID (Packet Identifier). In a packet the PID of which is 0, a program association table (PAT) is stored. In a packet the PID of which is 100, a program map table (PMT) is stored. In a packet the PID of which is 110, an initial object descriptor section (Initial OD section) is stored. In a packet the PID of which is 101, object data of MPEG2 video is stored. In a packet the PID of which is 102, object data of MPEG1 audio is stored. In a packet the PID of which is 103, an object composition information section is stored. In a packet the PID of which is 104, an object descriptor section (OD section) is stored. In a packet the PID of which is 105, object data of MPEG4 video (#1) is stored. In a packet the PID of which is 106, object data of MPEG4 video (#2) is stored. In this first embodiment, the multiplexed packet stream is demultiplexed with reference to the PIDs given to the respective packets, by analyzing the above-mentioned data.

Figure 3:
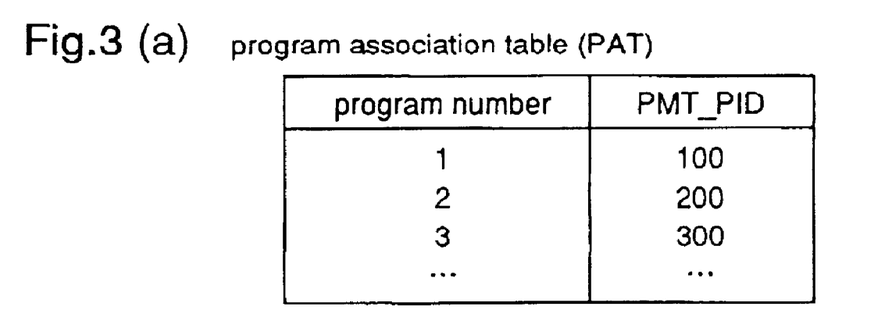

FIGS. 3(a)–3(d) are diagrams showing portions of the program association table (PAT), the program map table (PMT), the initial object descriptor section (Initial OD), and the object descriptor section (OD section), respectively. The program association table (PAT) shown in FIG. 3(a) has program numbers of the program map table, and identification numbers PMT_PID of packets corresponding to the respective program numbers. The program map table (PMT) shown in FIG. 3(b) has stream types as data types, and identification numbers ES_PID of packets corresponding to the respective stream types. The data type is information indicating the kind of data content of the packet specified by the PID. In FIG. 3(b), ES_PID_101 indicates that the data type is MPEG2 Video, ES_PID_102 indicates that the data type is MPEG1 Audio, and ES_PID_110 indicates that the data type is MPEG4. The initial object descriptor section (Initial OD section) shown in FIG. 3(c) has stream types as data types, and identification numbers ES_PID of packets corresponding to the respective stream types. In FIG. 3(c), ES_PID_103 indicates that the data type is object composition information (SD), and ES_PID_104 indicates that the data type is object descriptor section (OD section). The object descriptor section (OD section) shown in FIG. 3(d) has stream types as data types, and identification numbers ES_PID of packets corresponding to the respective stream types. The object descriptor section further includes a stream map table (SMT) describing ES_PID of MPEG4 data although it is not shown in FIG. 3(d). In FIG. 3(d), ES_PID_105 indicates that the data type is MPEG4 Video (#1), and ES_PID_106 indicates that the data type is MPEG4 Video (#2).

Hereinafter, the operation of the demultiplexing apparatus according to the first embodiment will be described using FIGS. 1, 2, and 3(a)–3(d).

When the demultiplexer 301 receives the multiplexed packet stream shown in FIG. 2, it separates the packet, the PID of which is 0, from the stream. This packet is output as a program association table and stored in the first memory 304.

The information analyzer 310 receives the program association table from the first memory 304 and analyzes this table. To be specific, the analyzer 310 searches the table for a program number corresponding to a program to be received by the demultiplexing apparatus, and obtains PMT_PID m which is a PID value of a program map table associated to the program number. Then, the information analyzer 310 outputs the PMT_PID_m to the demultiplexer 301. In this first embodiment, it is assumed that the analyzer 310 obtains PMT_PID_100 shown in FIG. 3(a) as the PMT_PID_m.

Receiving the PMT_PID_m, the demultiplexer 301 separates a packet, the PID of which matches the PMT_PID_m, from the multiplexed packet stream shown in FIG. 2 (in this case, a packet having PID_100). This packet is output as a program map table and stored in the second memory 305.

The information analyzer 310 receives the program map table from the second memory 305, and analyzes this table to obtain the PID of packet of data related to the program to be received by the demultiplexing apparatus (in this case, ES_PID_101 and ES_PID_102 shown in FIG. 3(b)), and the identification number PID_iod of packet containing information for expressing the meaning in MPEG4 (ES_PID_110 shown in FIG. 3(b)). Then, the information analyzer 310 outputs the ES_PID_110 as the PID_iod value of the packet relating to MPEG4.

The demultiplexer 301 separates a packet, the PID of which matches the ES_PID_110, from the multiplexed packet stream shown in FIG. 2. This packet is output as an initial object descriptor section and stored in the third memory 306.

The information analyzer 310 receives the initial object descriptor section from the third memory 306, and analyzes this table to obtain the identification number PID_sd indicating that the data type is the object composition information section (object composition information data or scene description data) (in this case, ES_PID_103 shown in FIG. 3(c)), and the identification number PID_od indicating that the data type is the object descriptor section (object descriptors) (ES_PID_104 shown in FIG. 3(c)). These PIDs are output to the demultiplexer 301.

The demultiplexer 310 separates the packet of the object composition information section indicated by the PID_sd and the packet of the object descriptor section indicated by the PID_od from the multiplexed packet stream shown in FIG. 2, and stores the object composition information section and the object descriptor section in the fourth memory 307 and the fifth memory 308, respectively.

Next, the information analyzer 310 receives the object composition information from the object composition information section stored in the fourth memory 307, analyzes this information, and outputs composition information, such as composition position and composition order, toward the compositor 309. Further, the information analyzer 310 receives the object descriptor section from the fifth memory 308, and analyzes this section to obtain the data type indicating video or audio data coded by MPEG4 from the SMT included in this section. The analyzer 310 outputs this data type to the demultiplexer 301. In this first embodiment, there are two pieces of data having this data type, and these data are respectively described as first object data and second object data. For example, the PID value of the first object is described PID_d1 while the PID value of the second object data is described as PID_d2. Referring to FIG. 3(d), it is assumed that the PID_d1 is ES_PID_105, and the PID_d2 is ES_PID_106.

The demultiplexer 301 separates the packets indicated by PID d1 and PID_d2 from the multiplexed packet stream shown in FIG. 2, and outputs these packets to the first decoder 302 and the second decoder 303, respectively. To be specific, the first object data indicated by ES_PID_105 (PID d1) is output to the first decoder 302 to be decoded, and the second object data indicated by ES_PID_106 (PID_d2) is output to the second decoder 303 to be decoded.

In the compositor 309, the first and second decoded object data respectively decoded by the first and second decoders 302 and 303 are composited according to the composition information, such as composition position and composition order, supplied from the information analyzer 310.

The demultiplexing apparatus according to the first embodiment of the invention has various effects as follows.

Since the information analyzer 310 obtains the PIDs in the initial OD section in addition to the PIDs of the respective data described in the program map table, and outputs these PIDs toward the demultiplexer 301, reliable separation of MPEG4 data is realized.

Further, since the PIDs of the packets for transmitting the object composition information and the object descriptors can be identified by the data types indicating the meaning in MPEG4 described in the initial object descriptor section, these PIDs can be identified with reliability.

Moreover, since the IDs of the object descriptors described in the object composition information are compared with the IDs of the respective object descriptors in the object descriptor section, the object composition information can be associated with the object data designated by the object descriptor, whereby the object data separated by the demultiplexer 301 can be composited according to the composition position and the composition order described in the composition information.

[Embodiment 2]

Figure 4:
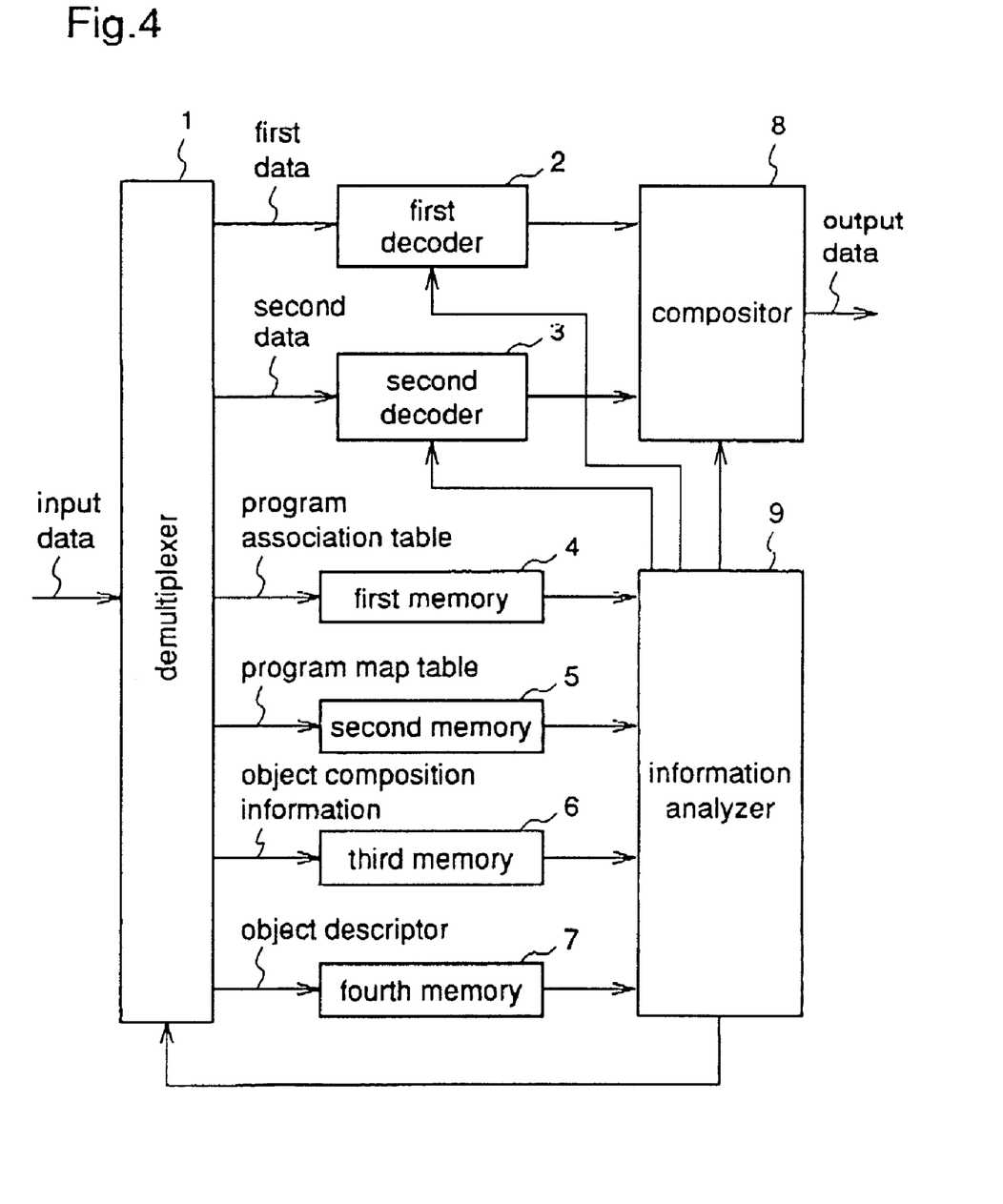
FIG. 4 is a block diagram illustrating a demultiplexing apparatus according to a second embodiment of the invention.

FIG. 4 is a block diagram for explaining a demultiplexing apparatus according to a second embodiment of the present invention.

As shown in FIG. 4, the demultiplexing apparatus according to the second embodiment comprises a demultiplexer 1 which receives a multiplexed packet stream in which a plurality of object data are multiplexed, and demultiplexes the multiplexed data with reference to packet identification numbers given to the packets; a first decoder 2 which decodes first object data separated from the multiplexed data and outputs first decoded object data; a second decoder 3 which decodes second object data separated from the multiplexed data and outputs second decoded object data; a first memory 4 which stores a program association table (first information relating to a program) separated by the demultiplexer 1; a second memory 5 which stores a program map table (second information relating to the program) separated by the demultiplexer 1; a third memory 6 which stores object composition information of an object composition information section separated by the demultiplexer 1; a fourth memory 7 which stores object descriptors of an object descriptor section having information relating to the object data separated by the demultiplexer 1; a compositor 8 which composites the first decoded object data and the second decoded object data; and an information analyzer 9 which analyzes the packet identification numbers from the first information relating to the program, the second information relating to the program, the object composition information, or the object descriptors.

A description is now given of the operation of the demultiplexing apparatus according to the second embodiment.

The data input to the demultiplexer 1 is a multiplexed packet stream which is defined as a transport stream (TS) in MPEG2. Each packet in the multiplexed packet stream is given a packet identification number called PID (packet identifier). Initially, the demultiplexer 1 separates a packet the PID of which is 0, and outputs this packet as a program association table to be stored in the first memory 4.

The information analyzer 9 receives the program association table from the first memory 4, searches the table for a program number corresponding to a program to be received by the demultiplexing apparatus, and obtains PID_m which is a value of a program map PID associated to the program number. Then, the analyzer 9 outputs the PID_m to the demultiplexer 1.

Receiving the PID_m, the demultiplexer 1 separates a packet, the PID of which matches the program map PID_m, from the multiplexed packet stream, and outputs this packet as a program table to be stored in the second memory 5.

The information analyzer 9 receives the program map table from the second memory 5, and obtains the PID of packet of data related to the program to be received by the demultiplexing apparatus.

Further, the information analyzer 9 analyzes information for expressing the meaning in MPEG4, which information is described in relation to the PID of each data in the program map table. To be specific, this information comprises the data types in MPEG4, the object IDs of the MPEG4 objects described by the data types, and the PIDs of the MPEG4 packets. The data type indicates the kind of data content of the packet specified by the PID. There are three kinds of data contents as follows: an object composition information section, an object descriptor section, and data other than these sections. The information analyzer 9 analyzes the data type, and outputs the identification number PID_syn of the packet including the object composition information (object composition information section) and the identification number PID_od of the packet including the object descriptors (object descriptor section), toward the demultiplexer 1.

When the data type detected by the information analyzer 9 from the program map table is neither the object composition information section nor the object descriptor section, the information analyzer 9 obtains the object ID. When an MPEG4 FlexMux channel (FMC) is described, the information analyzer 9 obtains this as well. The FMC means a packet identification number in MPEG4 packetization. In this second embodiment, there are two pieces of data having the data type other than the above-mentioned sections, and these data are respectively described as the first object data and the second object data. In the first object data, no FMC is used. Its PID value is PID_d1, and its object ID value is OD_id_d1. In the second object data, FMC_d2 is described as an FMC value. Its PID value is PID_d2, and its object ID value is OD_id_d2. The information analyzer 9 outputs PID_d1, PID_d2, and FMC_d2 toward the demultiplexer 1.

Receiving PID_syn, PID_od, PID_d1, PID_d2, and FMC_d2, the demultiplexer 1 separates a packet the PID of which is PID_syn (object composition information section) from the multiplexed packet stream, and outputs this packet as object composition information to the third memory 6. Further, the demultiplexer 1 separates a packet the PID of which is PID_od (object descriptor section) from the multiplexed packet stream, and outputs this packet as object descriptors to the fourth memory 7. Further, the demultiplexer 1 separates a packet, the PID of which is PID_d1, and outputs this packet to the first decoder 2. Furthermore, the demultiplexer 1 separates a packet, the PID of which is PID_d2 and the FMC of which is FMC_d2, and outputs this packet to the second decoder 3.

Receiving the object composition information, the information analyzer 9 obtains information such as the composition position of objects and the hierarchy of objects, and the object IDs of the respective objects, and outputs these to the compositor 8. Further, the information analyzer 9 receives an object descriptor to which the object ID value of the first object data, OD_id_d1, is given, and obtains a coding scheme Code_d1, a code AL_predefined_d1 indicating whether the MPEG4 packetization using the Access Unit Layer exists or not, and a code AL_config d1 indicating setting information of the packetization. The information analyzer 9 analyzes these codes to create access-unit-layer instruction information AL_d1, and outputs AL_d1 and Code_d1 to the first decoder 2. Moreover, the information analyzer 9 receives an object descriptor to which the object ID value of the second object data, OD_id_d2, is given, and obtains a coding scheme Code_d2, a code AL_predefined_d2 indicating whether the MPEG4 packetization using the Access Unit Layer exists or not, and a code AL config_d2 indicating setting information of the packetization. The information analyzer 9 analyzes these codes to create access-unit-layer instruction information AL_d2, and outputs AL_d2 and Code_d2 to the second decoder 3.

The first decoder 2 decodes the first object data according to the coding scheme Code d1, and outputs the decoded data. The second decoder 3 decodes the second object data according to the coding scheme Code_d2, and outputs the decoded data.

The composition 8 receives the decoded first object data and the decoded second object data, and composites the first and second object data with reference to the object IDs and the information relating to the object hierarchy and the like, which are supplied from the information analyzer 9, and outputs the composite data.

The above-mentioned demultiplexing apparatus according to the second embodiment provides the following effects.

Since the information analyzer 9 obtains the PID of the MPEG4 multiplexed packet in addition to the PID of each data described in the program map table, and outputs this PID to the demultiplexer 1, reliable separation of the MPEG4 data is realized.

Further, since the PIDs of the packets for transmitting the object composition information section and the object descriptor section are identified by the data types described in the program map table and indicating the meaning in MPEG4, these PIDs can be identified with reliability.

Furthermore, since the object IDs in MPEG4 are obtained with respect to the PIDs of the respective data described in the program map table, and these object IDs are compared with the object IDs described in the object descriptor section, the object IDs can be associated with the PIDs, whereby the respective data separated with PIDs can be composited using the object IDs described in the object composition information section.

Moreover, when the information analyzer 9 receives the object descriptors, it analyzes the code indicating whether the MPEG4 Access Unit Layer is used or not and the code indicating the setting information, and outputs the result of the analysis together with the information indicating the coding scheme toward the decoder. So, the decoder can perform appropriate header processing of the Access Unit Layer and appropriate decoding, and this enables packetization using no MPEG4 Access Unit Layer. Accordingly, a broadcasting in which MPEG4 object data is mixed can be received by the conventional MPEG2 receiver, while PES-packetized data can be received by the MPEG4 receiver.

In the first (second) embodiment described above, when the information analyzer 310 (9) receives the object composition information and the object descriptors to analyze the contents thereof, it may receive these data to which version numbers, the values of which vary when the contents of these data vary, are added as header information. In this case, the information analyzer 310 (9) stores the version numbers of these data once analyzed and, when these data are input nest, the version numbers of the input data are compared with the version numbers stored in the analyzer 310 (9). Only when the version numbers do not match, the analyzer 310 (9) analyzes the data again. Thereby, the burden on data analysis by the information analyzer 310 (9) is significantly reduced.

Further, the information analyzer 310 (9) may receive the data obtained by dividing the object composition information and the object descriptors into a plurality of sections and giving a section number at the head of each section. In this case, the information analyzer 310 (9) can restore the object composition information and the object descriptors by integrating the sections.

Furthermore, the information analyzer 310 (9) may receive the data to which an error detection code is added at the end of each section. In this case, the information analyzer 310 (9) can check whether the data within each section includes a data error or not, by referring to the error detection code. As an error detection code, a CRC (Cyclic Redundancy Check) code or a checksum is available.

While in the first (second) embodiment of the invention the demultiplexer 301 (1), the first and second decoders 302 and 303 (2 and 3), the compositor 309 (8), and the information analyzer 310 (9) are described as individual units, the present invention is not restricted thereto. In an actual hardware structure, these units can be implemented by at least one LSI or microprocessor. Further, it is needless to say that the first to fifth memories can be implemented by at least one memory, such as a DRAM (Dynamic Random Access Memory) or a SDRAM (Synchronous Dynamic Random Access Memory).

While in the first and second embodiments the demultiplexers 301 and 1 receive a multiplexed packet stream in which packets are multiplexed by MPEG2, these demultiplexers may receive multiplexed packet streams obtained by other schemes, such as a multiplexing scheme defined in ITU-TH.223, or TCP (Transmission Control Protocol), UDP (User Datagram Protocol), and RTP (Realtime Transport Protocol), which protocols are used in internet.

Moreover, while the demultiplexing apparatuses according to the first and second embodiments are implemented by hardware, the present invention is not restricted thereto. The demultiplexer, the first and second decoders, the compositor, and the information analyzer according to the aforementioned embodiments may be implemented as a software program in which the functions of these units are programmed, with the same effects as described for the aforementioned embodiments.

[Embodiment 3]

Figure 5:
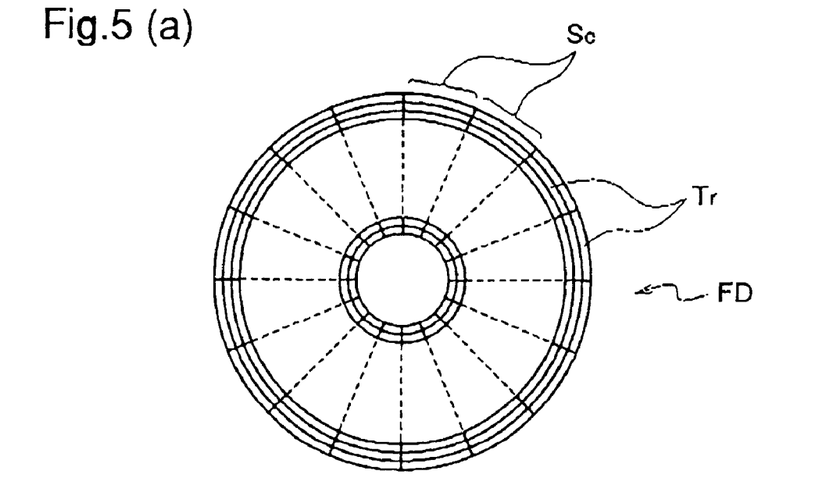

FIGS. 5(a)–5(c) are diagrams for explaining the case where the demultiplexing process according to the first or second embodiment is implemented by a computer system using a floppy disk containing a program of the demultiplexing process. More specifically, FIG. 5(b) shows a front view of a case F containing the floppy disk, a cross-sectional view thereof, and the floppy disk FD (recording medium body). FIG. 5(a) shows an example of a physical format of the floppy disk FD. At the surface of the disk, a plurality of tracks Tr are formed concentrically from the outer circumference of the disk toward the inner circumference. Each track is divided into 16 sectors $S_e$ in the angular direction. Therefore, in the floppy disk containing the above-mentioned program, data of the program are recorded in assigned sectors Se on the floppy disk FD.

FIG. 5(c) shows the structure for recording/reproducing the program in/from the floppy disk FD. When the program is recorded in the floppy disk FD, data of the program are written in the floppy disk FD from the computer system Cs through the floppy disk drive FDD. When the above-mentioned demultiplexing apparatus is constructed in the computer system Cs from the program recorded in the floppy disk FD, the program is read from the floppy disk FD by the floppy disk drive FDD and then loaded to the computer system Cs.

As described above, when a program for implementing the present invention by software is recorded in a data recording medium such as a floppy disk, demultiplexing of multiplexed data according to the aforementioned embodiments can be easily executed in an independent general-purpose computer system.

While in this third embodiment a floppy disk is employed as a data recording medium, an optical disk may be employed in similar way. Further, applicable recording media are not restricted thereto, namely, any recording media, such as an IC card and a ROM cassette, may be employed as long as the above-mentioned program can be recorded therein.

What is claimed is:

1. A demultiplexing apparatus comprising:
   means for separating a program association table from an MPEG2 transport stream and storing the same in a memory;
   means for analyzing the program association table to obtain a packet identifier in a program map table relating to a desired program;
   means for separating the program table from the transport stream and storing the same in the memory;
   means for analyzing the program map table to obtain packet identifiers of transport stream packets for transmitting object composition information, object description information, and M pieces of audio visual object data, respectively, as well as analyzing the program map table to obtain correspondences between the packet identifiers of M pieces of object data and an identifier od_id of audio visual object data in the object composition information;
   information analysis means for separating object composition information, object description information, and M pieces of object data from the transport stream with referring to the respective packet identifiers, and storing the same in the respective memories;
   decoding means for decoding M pieces of object data; and
   means for composing the M pieces of decoded object data in accordance with the composition information with referring to the correspondence between the packet identifiers and the identifier od_id.

2. A demultiplexing apparatus as defined in claim 1 wherein:
   said information analysis means analyzes N pieces of information relating to the program, obtains a packet identification number PID_syn of a packet containing the object composition information, and outputs the packet identification number PID_syn.

3. A demultiplexing apparatus as defined in claim 1 wherein:
   said information analysis means analyzes N pieces of information relating to the program, obtains a packet identification number PID_od of a packet containing the information relating to the object data, and outputs the packet identification number PID_od.

4. A demultiplexing apparatus as defined in claim 1 wherein:
   said information analysis means analyzes the object composition information, and outputs information indicating the hierarchical relationship of the object data toward the composing means; and
   said composing means composes the M pieces of decoded object data with reference to the hierarchical relationship.

5. A demultiplexing apparatus as defined in claim 1 wherein:
   said information analysis means analyzes the information relating to the object data, judges a code A1_predefined for each of the object data, which code indicates whether packetization according to the international standard MPEG4 exists or not, and outputs the code A1_predefined toward the composing means; and
   said composing means performs de-packetization of the MPEG4 packetization for each object data with reference to the code A1_predefined.

6. A demultiplexing apparatus as defined in claim 1 wherein:
   said information analysis means analyzes the information relating to the object data, judges a code A1_predefined for each of the object data, which code indicates whether packetization according to the international standard MPEG4 exists or not, and outputs the code A1_predefined toward the decoding means; and
   said decoding means performs de-packetization of the MPEG4 packetization with reference to the code A1_predefined.

7. A demultiplexing apparatus as defined in claim 1 wherein:
   said information analysis means analyzes the information relating to the object data, judges a code A1_config for each of the object data, which code indicates setting information of a packet header according to the international standard MPEG4, and outputs the code A1_config toward the composing means; and said composing means performs de-packetization of the MPEG4 packetization for each object data with reference to the code A1_config.

8. A demultiplexing apparatus as defined in claim 1 wherein:

said information analysis means analyzes the information relating to the object data, judges a code A1_config for each of the object data, which code indicates setting information of a packet header according to the international standard MPEG4, and outputs the code A1_config toward the decoding means; and said decoding means performs de-packetization of the MPEG4 packetization with reference to the code A1_config.

9. A demultiplexing apparatus as defined in claim 1 wherein:

said information analysis means analyzes the N pieces of information relating to the program, obtains a packet identification number PID_d of a packet containing the object data and a packet identification number FMC_d according to the international standard MPEG4, and outputs these identification numbers to separate the packet containing the object data from the input multiplexed packet stream with reference to the identification numbers PID_d and FMC_d, and outputs the packet.

10. A demultiplexing apparatus as defined in claim 1 wherein said information analysis means obtains a code for deciding whether the packet identification number FMC_d according to the international standard MPEG4 is added or not, by analyzing N pieces of information relating to the program.

11. A demultiplexing apparatus as defined in claim 1 wherein said information analysis means receives the object composition information which is divided into at least one section, integrates these sections with reference to version numbers and section numbers which are added at the heads of the respective sections, decides whether data of each section has a data error or not according to an error detection code added to the end of each section, and discards the section having a data error, thereby obtaining the object composition information.

12. A demultiplexing apparatus as defined in claim 1 wherein said information analysis means receives the information relating to the object data, which information is divided into at least one section, integrates these sections with reference to version numbers and section numbers which are added at the heads of the respective sections, decides whether data of each section has a data error or not according to an error detection code added to the end of each section, and discards the section having a data error, thereby obtaining the information relating to the object data.

13. A demultiplexing method comprising the steps of:

separating a program association table from an MPEG2 transport stream and storing the same in a memory;

analyzing the program association table to obtain a packet identifier in a program map table relating to a desired program;

separating the program table from the transport stream and storing the same in the memory;

analyzing the program map table to obtain packet identifiers of transport stream packets for transmitting object composition information, object description information, and M pieces of audio visual object data, respectively, as well as analyzing the program map table to obtain correspondence between the packet identifiers of M pieces of object data and an identifier od_id of audio visual object data in the object composition information;

separating object composition information, object description information, and M pieces of object data from the transport stream with referring to the respective packet identifiers, and storing the same in the respective memories;

decoding M pieces of object data; and composing the M pieces of decoded object data in accordance with the composition information with referring to the correspondence between the packet identifiers and the identifier od_id.

14. A data recording medium in which a program is recorded, said program comprising the steps of:

separating a program association table from an MPEG2 transport stream and storing the same in a memory;

analyzing the program association table to obtain a packet identifier in a program map table relating to a desired program;

separating the program table from the transport stream and storing the same in the memory;

analyzing the program map table to obtain packet identifiers of transport stream packets for transmitting object composition information, object description information, and M pieces of audio visual object data, respectively, as well as analyzing the program map table to obtain correspondences between the packet identifiers of M pieces of object data and an identifier od_id of audio visual object data in the object composition information;

separating object composition information, object description information, and M pieces of object data from the transport stream with referring to the respective packet identifiers, and storing the same in the respective memories;

decoding M pieces of object data; and composing the M pieces of decoded object data in accordance with the composition information with referring to the correspondence between the packet identifiers and the identifier od_id.

* * * * *